United States Patent Office 3,487,053
Patented Dec. 30, 1969

3,487,053
INTERPOLYMERS FORMED FROM ETHYLENE, 1-MONOOLEFINS AND A 4-ALKYLIDENE CYCLOPENTENE
Harold J. Wahlborg and William C. Bond, Jr., Baton Rouge, La., assignors to Copolymer Rubber & Chemical Corporation, a corporation of Louisiana
No Drawing. Filed June 10, 1966, Ser. No. 560,939
Int. Cl. C08f *19/00;* C07c *19/04*
U.S. Cl. 260—79.5
15 Claims

ABSTRACT OF THE DISCLOSURE

A compound having the general formulae

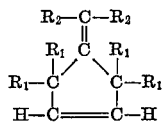

and

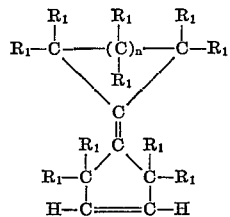

wherein $n$ is an integer having a valve of 0 to 9 and $R_1$ and $R_2$ are selected from the group consisting of hydrogen, halogen and monovalent hydrocarbon radicals containing 1–20 carbon atoms and sulfur-vulcanizable interpolymers prepared by interpolymerization thereof with ethylene and at least one monoolefin having from 3–16 carbon atoms.

---

This invention relates to novel polyene monomers and sulfur-vulcanizable interpolymers, and to processes for their preparation. The invention further relates to a process for curing the interpolymers of the invention, and the resulting cured interpolymers.

Elastomers may be prepared by interpolymerizing a monomeric mixture composed of ethylene and at least one higher alpha-monoolefin having 3–16 carbon atoms in solution in an organic solvent and in the presence of a Ziegler catalyst. However, the resulting elastomers contain no ethylenic unsaturation and substances other than sulfur must be used as curing agents, such as the organic peroxides.

Efforts have been made heretofore to provide ethylenic unsaturation in the above-mentioned class of elastomers by including a reactive monomeric polyene in the mixture of alpha-monoolefins to be polymerized. The resulting interpolymers contain residual unsaturation and the polymer may be readily cured with sulfur following prior art practices to thereby provide vulcanized elastomeric products.

Many of the polyene monomers which have been proposed heretofore have not been entirely satisfactory for a number of reasons. For instance, ofter the prior art polyene monomers do not enter into the polymerization reaction readily, or contain a number of reactive double bonds which cause cross-linking of the polymer, or the residual double bonds are located in the polymer chain and cause poor ozone resistance. Still other prior art polyene monomers result in low catalyst mileage, and/or have other adverse effects on the polymerization such as a tendency to produce insoluble polymer which tends to deposit on the internal surfaces of the reactor. Additionally, the polyene monomers available heretofore have often been costly, and/or could not be prepared from readily available starting materials. Accordingly, the art has long sought an entirely satisfactory polyene monomer for interploymerizing with a mixture of monoolefin monomers to thereby produce sulfur-vulcanizable interploymers which have desirable characteristics, and wherein the polymerization reaction proceeds readily and without difficulties.

It is an object of the present invention to provide novel compounds which are especially useful as polyene monomers for preparing sulfur-vulcanizable interpolymers.

It is a further object to provide a process for preparing the novel compounds of the invention.

It is still a further object to provide novel sulfur-vulcanizable interploymers and cured interpolymers prepared therefrom.

Still other objects and advantages of the invention will be apparent to those skilled in the art upon reference to the following detailed description and the examples.

The novel compounds of the invention have the following structural formulae

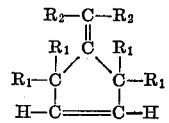

and

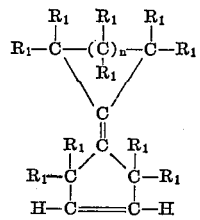

wherein $n$ is an integer having a value of 0–9 and $R_1$ and $R_2$ are selected from the group consisting of hydrogen, halogen and monovalent hydrocarbon radicals containing 1–20 carbon atoms and preferably 1–5 carbon atoms. For better results, $R_1$ is hydrogen, at least one $R_2$ is an alkyl group containing 1–5 carbon atoms, and $n$ is an integer having a value of 2–4. It is understood that each $R_1$ and/or $R_2$ in the foregoing formulae may be selected from the above monovalent substituents to thereby arrive at a specific compound. Also, the monovalent hydrocarbon radicals may have straight or branched chains, and may be either saturated or ethylenically unsaturated. However, preferably the unsaturated hydrocarbon radicals contain no conjugated double bonds, nor should a conjugated double bond system be formed with the two double bonds which are present initially in the basic compounds. Of the above classes of compounds, the preferred compound for use as a polyene monomer in preparing sulfur curable elastomers is 1-isopropylidene-3-cyclopentene, having the following structural formula:

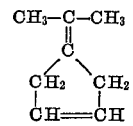

The above classes of novel compounds may be prepared by various processes. However, partial hydrogenation of the corresponding fulvene compound in the presence of a hydrogenation catalyst is usually the preferred process. For example, it has been discovered unexpectedly that one mole of hydrogen adds to the 2,4-cyclopentadiene nucleus of the fulvene compound by 1,4-addition to produce the corresponding 3-cyclopentene nucleus, as illustrated in the following reaction:

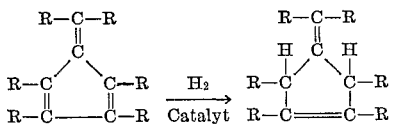

A number of suitable hydrogenation catalysts may be employed when conducting the partial hydrogenation of the fulvene compound. However, usually Raney nickel is preferred. The partial hydrogenation is preferably carried out in a pressure vessel under mild conditions until about one mole of hydrogen ($H_2$) per mole of the fulvene compound has reacted. For example, the pressure of the hydrogen may be about 15–50 pounds per square inch, and preferably about 30 pounds per square inch, and the temperature of the hydrogenation may be between 0° C. and 75° C., and preferably about 25° C. The fulvene compound may be dissolved in an organic solvent which is inert under the conditions of the hydrogenation, such as a normally liquid saturated hydrocarbon containing 5–8 hydrocarbons. Pentane is usually the preferred solvent; however, it is understood that a wide variety of inert organic solvents may be employed.

Methods other than catalytic hydrogenation may be used to partially reduce the fulvene compounds to the desired novel compounds of the invention. For example, a chemical reduction such as the Birch reduction may be used.

The reduction reaction product contains the desired 3-cyclopentene derivative of the starting fulvene compound and other isomers which may be present, such as the 2-cyclopentene derivative. The reaction mixture may be conveniently separated by distillation to thereby obtain a pure fraction of the desired 3-cyclopentene derivative. Other methods of separating the reaction mixture may be used, if desired.

The fulvene compounds which are used as starting materials for the partial reduction are well known in the art. The preparation of numerous fulvene compounds is disclosed in U.S. Patents Nos. 2,589,969, 2,628,955, 3,051,765, 3,218,365 and 3,192,275, the disclosures of which are incorporated herein by reference.

In general, the most convenient method of preparing the fulvene compounds is by reaction of an aldehyde or ketone with cyclopentadiene or a substituted cyclopentadiene in the presence of a catalyst. Suitable catalysts include primary or secondary amines, such as ethylamine; however, it is understood that a wide variety of basic catalysts may be employed. The cyclopentadiene or substituted cyclopentadiene may be reacted with a wide variety of aldehydes and ketones to produce the corresponding fulvene compounds, including methyl ethyl ketone, diethyl ketone, methyl propyl ketone, ethyl propyl ketone, cyclohexanone, cyclopentanone, acetophenone, formaldehyde, acetaldehyde, propionaldehyde, butyraldehyde, isobutyraldehyde, valeraldehyde, and benzaldehyde. The reaction may take place in the presence or absence of an organic solvent which is inert under the reaction conditions. In some instances, reactants such as cyclopentadiene and acetone serve as the reaction medium.

The novel compounds described above are especially useful as polyene monomers in the preparation of sulfur vulcanizable elastomeric interpolymers from a monomeric mixture containing ethylene and monoolefins having 3–16 carbon atoms. It is also possible to use polyene monomers in preparing the elastomers of the invention which have the following structural formula:

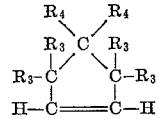

wherein $R_3$ and $R_4$ are selected from the group consisting of hydrogen, halogen and monovalent hydrocarbon radicals containing 1–20 and preferably 1–5 carbon atoms, and at least one of either $R_3$ or $R_4$ is an ethylenically unsaturated monovalent hydrocarbon radical. For best results, $R_3$ and $R_4$ should be free of conjugated double bonds, and a conjugated double bond system should not be formed with the two double bonds in the basic compound, so as to avoid 1,4-addition during the polymerization reaction and the resulting residual double bond in the backbone of the polymer.

Prior art reaction conditions and procedures may be used when preparing the sulfur-vulcanizable elastomers of the invention with the exception of substituting the polyene monomers described herein for those used in the prior art. Examples of patents which disclose reaction conditions for preparing elastomers from monomeric mixtures of alpha-monoolefins and polyenes include U.S. Patents Nos. 2,933,480, 3,093,620, 3,093,621 and 3,211,709, the disclosures of which are incorporated herein by reference.

The specific mixture of monoolefins, and ratio of monomers to be polymerized in accordance with the invention need not differ from those used in the prior art. In many instances, it is preferred that the elastomers be prepared from a monomeric mixture containing ethylene, propylene and the polyene third monomers described herein. The resulting elastomer may contain chemically bound therein molar ratios of ethylene to propylene varying between 80:20 and 20:80, and preferably between 70:30 and 55:45. The propylene monomer may be chemically bound in the elastomer in an amount to provide an unsaturation level of not less than about 2 double bonds per 1000 carbon atoms in the elastomer; however, much higher unsaturation levels are possible, such as up to, for example, 5, 10, 20, 30, 60 or more double bonds per 1000 carbon atoms. The specific unsaturation level selected in a given instance will vary depending upon the desired properties in the elastomer.

In instances where a tetrapolymer or an interpolymer from five or more different monomers is prepared, then one or more alpha-monoolefins containing about 4–12 carbon atoms should be substituted for an equal molar quantity of bound propylene in the above-mentioned elastomer composition. The range of the fourth monomer in tetrapolymers may be, for example, about 5–20 mole percent, but smaller amounts may be present such as 1, 2, 3 or 4 mole percent.

The polymerization solvent may be any suitable inert halogenated or saturated hydrocarbon which is liquid and relatively non-viscous under the reaction conditions, including the prior art solvents for the solution polymerization of monoolefins in the presence of Ziegler catalysts. Examples of satisfactory solvents include open chain saturated hydrocarbons containing 5–8 carbon atoms, of which hexane is usually preferred; aromatic hydrocarbons and especially those containing a single benzene nucleus such as benzene, toluene, etc.; saturated cyclic hydrocarbons which have boiling ranges approximately those for the open chain and aromatic hydrocarbons discussed above, and especially saturated cyclic hydrocarbons containing 5 or 6 carbon atoms in the ring; and halogenated solvents such as, for example, tetrachloroethylene, hexachloroethane, tetrachloroethane, carbon tetrachloride, etc. The solvent may be a mixture of one or more of the foregoing substances, such as a mixture of aliphatic and naphthenic hydrocarbon isomers having approximately the same boiling range as normal hexane. The solvent should be dry and free of substances which will interfere with the Ziegler catalyst to be used in the polymerization step.

Catalysts in accordance with the prior art may be used in preparing the elastomer. In general, prior art Ziegler-type catalysts may be used which are known to produce a satisfactory elastomer. Examples of such catalysts are disclosed in a large number of issued patents, such as U.S. Patents Nos. 2,933,480, 3,093,620, 3,093,621, 3,211,709 and 3,113,115. Examples of Ziegler catalysts include metal organic coordination catalysts prepared by contacting a compound of a metal of groups IVa, Va, VIa and VIIa of the Mendelejeff periodic chart of the elements, as typified by titanium, vanadium and chromium halides, with an organometallic compound of a metal of groups I, II or III of the Mendelejeff periodic chart which contains at least one carbon-metal bond, as typified by trialkyl aluminum and alkyl aluminum halides wherein the alkyl groups contain 1-20 and preferably 1-4 carbon atoms.

The preferred Ziegler catalyst is prepared from a vanadium compound and an alkylaluminum halide. Examples of suitable vanadium compounds include vanadium trichloride, vanadium tetrachloride, vanadium oxychloride, vanadium acetylacetonate, $VO(tert-butoxy)_3$, etc. Activators which are especially preferred include the alkylaluminum chlorides of the general formulae $R_1AlCL_2$ and $R_2AlCl$, and the corresponding sesquichlorides of the general formula $R_3Al_2Cl_3$, where R is a methyl, ethyl, propyl, butyl or isobutyl radical. A catalyst prepared from methyl or ethyl aluminum sesquichloride and vanadium oxychloride or $VO(tert-butoxy)_3$ is especially preferred. and when using this catalyst, the optimum ratio of the catalyst components is usually one mole of vanadium oxychloride for each 4-10 moles of the alkylaluminum sesquichloride to thereby provide a gram atomic weight ratio of aluminum to vanadium of 8:1 to 20:1.

The polymerization is preferably carried out on a continuous basis in a dry prior art reaction vessel closed to the outside atmosphere, which is provided with an agitator, reactor cooling means, conduit means for continuously supplying the ingredients of the reaction mixture including monomers and catalyst, and conduit means for continuously withdrawing the solution of elastomer. The polymerization is carried out in liquid phase in the organic solvent and in the presence of the Ziegler catalyst. The solution of elastomer in the polymerization solvent is withdrawn continuously from the reaction vessel, the catalyst is killed by addition of a catalyst deactivator such as methanol or water, and the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a prior art extrusion dryer or apron dryer. The dried crumb is then ready for baling and use in accordance with prior art practice.

The elastomer may be cured following prior art procedures, and special curing techniques are not necessary. As a general rule, a curing procedure which is normally followed in curing ethylene-propylene-diolefin monomer terpolymers is satisfactory. Various curing procedures, including the materials and the quantities thereof to be employed, are described in a large number of publications which are well known in the art, including the patents previously mentioned. Additional publications include Principals of High Polymer Theory and Practice, Schmidt et al., McGraw-Hill Book Company, New York (1948); The Applied Science of Rubber, edited by W. J. S. Naunton, published by Edward Arnold, Ltd., London (1961), and the encyclopedia of Chemical Technology, Kirk and Othmer, published by Innerscience Encyclopedia, Inc., New York (1953).

As is taught by the above-mentioned patents and publications, the elastomers may be vulcanized with vulcanizing agents including, for example, sulfur or sulfur bearing compounds which provide sulfur under the vulcanizing conditions. Sulfur is the preferred vulcanizing agent, and it is usually used in an amount of about 0.5–3, and preferably about 1–2, parts by weight per hundred parts by weight of the elastomer. Zinc oxide and other metal oxides may be used in an amount of, for example, about 2–10 parts by weight per 100 parts by weight of rubber (phr.). Vulcanization accelerators such as tetramethylthiuram monosulfide, tetramethylthiuram disulfide, the zinc salt of dimethyl dithiocarbamic acid, and the piperidine salt of pentamethylene dithiocarbamic acid may be used.

Conventional fillers and pigments may be added, such as about 10–200 phr. of carbon black, finely divided silica, esterified silica, titanium dioxide, kaolin, and whiting. It is also possible to oil extend the elastomer. Naphthenic oils for use in processing or extending rubbery polymers are preferred, and are usually added in an amount of about 10–100 phr. and preferably about 20–80 phr. Other types of oil may be used, such as the aromatic, highly aromatic and paraffinic oils.

Vulcanization is accomplished by heating the compounded elastomer at a vulcanizing temperature and for a period of time sufficient for the vulcanization reaction to occur. A temperature of about 130–160° C. for about 10–90 minutes, and preferably about 160° C. for about 30 minutes is satisfactory. The specific time and temperature that are selected in a given instance will depend upon the nature of the vulcanizing agent, accelerator, and other ingredients which are present. The elastomers of the invention are especially useful for the manufacture of mechanical goods, rubber hose, pneumatic tires, etc.

The foregoing detailed description and the following specific examples are for purposes of illustration only, and are not intended as being limiting to the spirit or scope of the appended claims.

EXAMPLE I

This example illustrates the preparation of 1-isopropylidene-3-cyclopentene.

Into a one liter flask fitted with a reflux condenser was placed 66 grams of cyclopentadiene, 58 grams of acetone and 6.5 grams of ethylamine. The flask was slowly warmed and after 3.2 hours the temperature had reached 75° C. Distillation gave 76.5 grams (72%) of dimethylfulvene, which had a boiling point of 44–46° at 10 mm. Hg.

A Parr hydrogenation flask was charged with 21.2 grams (0.2 mol) of the dimethylfulvene, one gram of Raney nickel, 180 ml. of pentane and hydrogen. The hydrogen pressure initially was about 30 pounds per square inch and the hydrogenation was carried out at about 25° C. A total of 0.225 mol of hydrogen was taken up in 33 minutes and the hydrogenation was terminated. Inspection of a vapor phase chromatogram of the hydrogenated solution showed that it contained 1-isopropylidene-3-cyclopentene. Most of this latter material was obtained by distillation and separation of the fraction boiling at 58–64° C. at 50 mm. Hg. Other close boiling isomers were also present, and a high purity product was obtained by redistilling the above impure fraction four times to obtain a pure fraction having a boiling point of 59–61° at 50 mm. Hg. The structure of this pure product was identified from its NMR spectrum (run in $CCl_4$ with tetramethylsilane as an internal standard), which showed the presence of two vinyl protons as a single peak at 5.7 p.p.m., four diallylic methylene protons absorbing at 2.9 p.p.m. and six allylic methyl protons absorbing at 1.6 p.p.m.

Equimolar quantities of other ketones or aldehydes may be substituted for acetone in the above process, reacted with the cyclopentadiene to produce the corresponding derivative thereof which contains the cyclopentadiene nucleus, and then reacted with one mole of hydrogen to produce the corresponding 3-cyclopentene derivative, which is substituted in the 1-position with the hydrocarbon residue from the ketone or aldehyde. Typical examples of ketones which may be substituted for the acetone include methyl ethyl ketone, diethyl ketone, methyl propyl ketone, ethyl propyl ketone, cyclohexanone, cyclopentanone, and acetophenone. Typical examples of aldehydes which may be substituted for the acetone include formaldehyde, acetaldehyde, propionaldehyde, butyraldehyde, isobutyraldehyde, valeraldehyde, and benzaldehyde. Also, fulvenes in general may be partially hydrogenated as set out above to produce the corresponding 3-cyclopentene derivatives which are substituted with a hydrocarbon radical in the 1-position.

EXAMPLE II

This example illustrates the preparation of an ethylene/propylene/1 - isopropylidene-3-cyclopentene terpolymer.

A seven-ounce beverage bottle was washed with soap and water, rinsed, washed with acetone and dried in an oven. The bottle was cooled while being flushed with dry nitrogen, sealed with a perforated metal cap having a rubber liner, and 100 cc. of pure hexane which had previously been treated with silica gel and stored over sodium ribbon was added by syringe. The hexane solution was saturated with ethylene and propylene. To the saturated solution was added 1.5 cc. of a solution of 0.1 gram pyridine in 10 cc. of hexane, 1.15 cc. of 1-isopropylidene-3-cyclopentene, 0.65 cc. of 1.5 molar.

solution (one millimole) and 2.1 cc. of a 0.02 molar VO(tert-butoxy)$_3$ solution (0.042 millimole). A continous stream of gas composed of 70% ethylene and 30% propylene was passed into the bottle over a period of 900 seconds. After 300 seconds, a second charge of catalyst was added which consisted of 0.5 millimole of

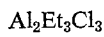

and 0.042 millimole of VO(tert-butoxy)$_3$. At 600 seconds, a final charge of catalyst, which was identical to the second charge, was added. At 900 seconds, the reaction mixture was deactivated by adding one ml. of isopropanol. The organic solution was washed with dilute HCl followed by water, and then dried over sodium sulfate. Precipitation with 100 ml. of isopropanol gave 1.8 grams of the rubbery terpolymer. The rubbery terpolymer was cured by mixing one gram thereof, which was dissolved in 100 cc. of hexane, with 0.85 gram of a slurry which consisted of, on a weight basis, 75 parts of naphthenic processing oil, 5 parts of ZnO, one part of stearic acid, 0.75 part of mercaptobenzothiazole, 1.5 parts of tetramethylthiuram monosulfide and 1.5 parts of sulfur. The hexane was removed by a stream of nitrogen gas while the mixture was being stirred constantly with a magnetic stirrer. The last traces of hexane were removed in a vacuum oven. The gummy mixture was pressed into a mold and cured at 150° for 30 minutes. The resulting strip of cured rubber was tested and found to possess very desirable physical properties, including excellent elasticity and toughness.

Comparable results are obtained when equimolar quantities of the various other 3-cyclopentenes mentioned in Example I, or 3-cyclopentenes substituted with an unsaturated hydrocarbon radical such as 1-(2-butenyl)-3-cyclopentene or 2-(3-hexenyl)-3-cyclopentene, are substituted for 1-isopropylidene-3-cyclopentene in the above example.

What is claimed is:
1. A composition of matter selected from the group consisting of compounds of the general formulae

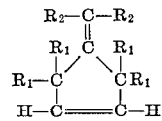

and

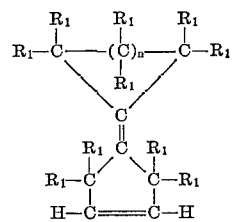

wherein $n$ is an integer having a value of 0 to 9 and $R_1$ and $R_2$ are selected from the group consisting of hydrogen, halogen and monovalent hydrocarbon radicals containing 1–20 atoms.

2. A composition of matter in accordance with claim 1 wherein $R_1$ is hydrogen, at least one $R_2$ is an alkyl group containing 1–5 carbon atoms, and $n$ is an integer having a value of 2 through 4.

3. A composition of matter in accordance with claim 1 wherein the compound has the formula

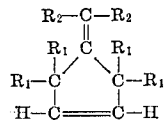

wherein $R_1$ is hydrogen and at least one $R_2$ is an alkyl group containing 1–5 carbon atoms.

4. 1-isopropylidene-3-cyclopentene.

5. A sulfur vulcanizable amorphous, solid interpolymer which is the product of the interpolymerization of ethylene, at least one monoolefin containing 3–16 carbon atoms, and at least one polyunsaturated monomer interpolymerizable therewith selected from the group consisting of

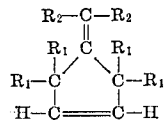

and

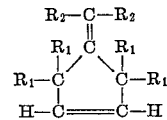

wherein $n$ is an integer having a value of 0 through 9, $R_1$ and $R_2$ are selected from the group consisting of hydrogen, halogen and monovalent hydrocarbon radicals containing 1–20 carbon atoms and $R_1$ and $R_2$ are free of conjugated double bonds, the mole ratio of chemically bound ethylene to the chemically bound monoolefin containing 3–16 carbon atoms being between 80:20 and 20:80, and the interpolymer containing at least 2 carbon-to-carbon double bonds per 1000 carbon atoms.

6. The interpolymer of claim 5 wherein $n$ is 2 through 4, $R_1$ is hydrogen in each instance, $R_2$ is an alkyl radical containing 1–5 carbon atoms.

7. The interpolymer of claim 5 wherein the polyunsaturated monomer is a compound having the formula

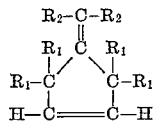

wherein $R_1$ is hydrogen and at least one $R_2$ is an alkyl group containing 1–5 carbon atoms.

8. The interpolymer of claim 5 wherein the polyunsaturated monomer is 1-isopropylidene-3-cyclopentene.

9. The interpolymer of claim 5 wherein the monoolefin containing 3–16 carbon atoms is propylene and the interpolymer contains 2–60 carbon-to-carbon double bonds per 1000 carbon atoms.

10. The interpolymer of claim 9 wherein the polyunsaturated monomer is a compound having the formula

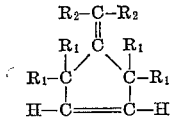

wherein $R_1$ is hydrogen and at least one, $R_2$ is an alkyl group containing 1–5 carbon atoms.

11. The interpolymer of claim 9 wherein the mole ratio of chemically bound ethylene to chemically bound propylene is between 70:30 and 55:45, the interpolymer contains about 2:30 carbon-to-carbon double bonds per 1000 carbon atoms, and the polyunsaturated monomer is 1-isopropylidene-3-cyclopentene.

12. A cured interpolymer obtained by curing the interpolymer of claim 5 with a heat activated curing agent.

13. A cured interpolymer obtained by curing the interpolymer of claim 8 with a heat activated curing agent.

14. A vulcanized interpolymer obtained by vulcanizing the interpolymer of claim 10 with sulfur.

15. A vulcanized interpolymer obtained by vulcanizing the interpolymer of claim 11 with sulfur.

References Cited

UNITED STATES PATENTS

| | | | |
|---|---|---|---|
| 3,310,537 | 3/1967 | Watts | 260—79.5 |
| 3,313,786 | 4/1967 | Kahle | 260—79.5 |
| 3,218,365 | 11/1965 | Fritz | 260—666 |
| 3,151,173 | 9/1964 | Nyce | 260—666 |
| 3,255,267 | 6/1966 | Fritz | 260—666 |
| 2,898,325 | 8/1959 | Fusco | 260—82 |
| 2,590,923 | 4/1952 | Block | 260—666 |

OTHER REFERENCES

Huntsmen, W. D.; DeBoer, J. A.; Woosley, M. H.: The Thermal Arrangement of 1-alken-5-ynes and 1,2,5-alkatriens, Jour. Amer. Chem. Soc., vol. 88:24, Dec. 20, 1966, pp. 5846–5850.

Chemical Abstracts, vol. 60: 3017e.
Chemical Abstracts, vol. 34: 5058(1).

JOSEPH L. SCHOFER, Primary Examiner
R. S. BENJAMIN, Assistant Examiner

U.S. Cl. X.R.

260—80.78, 88.2, 658, 666